United States Patent
Arakawa

[11] Patent Number: 6,072,855
[45] Date of Patent: Jun. 6, 2000

[54] METHOD AND APPARATUS FOR ACQUIRING IMAGE INFORMATION FOR ENERGY SUBTRACTION PROCESSING

[75] Inventor: Satoshi Arakawa, Kanagawa-ken, Japan

[73] Assignee: Fuji Photo Film Co., Ltd., Kanagawa-ken, Japan

[21] Appl. No.: 09/116,820

[22] Filed: Jul. 17, 1998

[51] Int. Cl.$^7$ ..................................................... H05G 1/64
[52] U.S. Cl. .................. 378/98.11; 378/98.9; 378/98.12; 250/582; 250/583; 250/588
[58] Field of Search ............... 378/98.11, 98.12, 378/98.9; 250/582, 583, 588

[56] References Cited

U.S. PATENT DOCUMENTS

| | | | |
|---|---|---|---|
| 4,541,106 | 9/1985 | Belanger et al. | 378/98.11 |
| 4,855,598 | 8/1989 | Ohgoda et al. | 250/582 |
| 5,081,355 | 1/1992 | Miyagawa et al. | 250/582 |
| 5,365,076 | 11/1994 | Itakura | 250/582 |
| 5,661,306 | 8/1997 | Arakawa | 250/484.4 |

*Primary Examiner*—David P. Porta
*Assistant Examiner*—Allen C. Ho
*Attorney, Agent, or Firm*—Sughrue, Mion, Zinn, Macpeak & Seas, PLLC

[57] ABSTRACT

Radiation having a high energy level is irradiated to an object, and high energy image information corresponding to the radiation having a high energy level, which radiation carries image information of the object, is thereby stored on a stimulable phosphor sheet, which allows light detection from its front surface that stands facing the object, and from its back surface. Primarily the image information, which has been stored at a portion of the stimulable phosphor sheet on the front surface side, is erased. Thereafter, radiation having a low energy level is irradiated to the object, and low energy image information corresponding to the radiation having a low energy level, which radiation carries image information of the object, is thereby stored on the stimulable phosphor sheet. The low energy image information is acquired from the portion of the stimulable phosphor sheet on the front surface side, and the high energy image information is acquired from the portion of the stimulable phosphor sheet on the back surface side.

9 Claims, 1 Drawing Sheet

METHOD AND APPARATUS FOR ACQUIRING IMAGE INFORMATION FOR ENERGY SUBTRACTION PROCESSING

BACKGROUND OF THE INVENTION

1. Field of the Invention

This invention relates to a method and apparatus for acquiring image information for energy subtraction processing. This invention particularly relates to a method and apparatus for acquiring image information for two-shot energy subtraction processing, in which two kinds of images are obtained with two times of exposure to radiation.

2. Description of the Prior Art

Techniques for reading out a recorded radiation image in order to obtain an image signal, carrying out appropriate image processing on the image signal, and then reproducing a visible image by use of the processed image signal have heretofore been known in various fields. Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

In the radiation image recording and reproducing systems wherein recording media, such as radiation film or stimulable phosphor sheets, are used, subtraction processing techniques for radiation images are often carried out on image signals detected from a plurality of radiation images of an object, which have been recorded on the recording media.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals, which components represent the image information recorded at corresponding sampling points (i.e., picture elements) in the radiation images, are then subtracted from each other. A difference signal is thereby obtained which represents the image of a specific structure or part of the object (hereinbelow also referred to as the pattern of a tissue, a structure, or the like) represented by the radiation images.

Basically, subtraction processing is carried out with either the so-called temporal (time difference) subtraction processing method or the so-called energy subtraction processing method. In the former method, in order for the image of a specific structure (for example, a blood vessel) of an object to be extracted from the image of the whole object, the image signal representing a radiation image obtained without injection of contrast media is subtracted from the image signal representing a radiation image in which the image of the specific structure (for example, a blood vessel) of the object is enhanced by the injection of contrast media. In the latter method, such characteristics are utilized that a specific structure of an object exhibits different levels of radiation absorptivity with respect to radiation with different energy distributions. Specifically, an object is exposed to several kinds of radiation with different energy distributions. Alternatively, the energy distribution of the radiation carrying image information of an object, is changed after it has been irradiated onto one of a plurality of radiation image recording media, after which the radiation impinges upon the second radiation image recording medium. In this manner, a plurality of radiation images are obtained in which different images of a specific structure are embedded. Thereafter, the image signals representing the plurality of the radiation images are weighted appropriately and subjected to a subtraction process in order to extract the image of the specific structure. The subtraction process is carried out with Formula (1) shown below.

$$Sproc = Ka \cdot H - Kb \cdot L + Kc \qquad (1)$$

wherein Sproc represents the subtraction image signal obtained from the subtraction process, Ka and Kb represent the weight factors, Kc represents the bias component, H represents the image signal representing the radiation image recorded with the radiation having a high energy level, and L represents the image signal representing the radiation image recorded with the radiation having a low energy level. (The group of Ka, Kb, and Kc will be referred to as the parameters for the subtraction process.)

The energy subtraction processing may be classified into two kinds of methods. One of the methods is two-shot energy subtraction processing, and the other is one-shot energy subtraction processing.

With the two-shot energy subtraction processing, wherein the difference in energy level between the two shots can be kept large, the range of the subtraction image signal obtained from the subtraction process can be kept wide, and therefore the contrast of the subtraction image reproduced from the subtraction image signal can be kept high. However, with the two-shot energy subtraction processing, the image signal components of the two image signals obtained from the two times of exposure to radiation, which image signal components accurately represent corresponding picture elements in the two images, must be subtracted from each other. Actually, in cases where the object is a living body, particularly the chest, in which the motion of the heart, or the like, is violent, it is not always possible to obtain two images, which are recorded at a certain interval of time and in which the corresponding positions accurately coincide with each other.

In the one-shot energy subtraction processing, two detectors are located one upon the other with an energy separating plate, or the like, intervening therebetween, and image signals are recorded respectively on the two detectors with a single, simultaneous exposure to radiation. Therefore, the image signals recorded on the two detectors can be obtained such that they may represent the images, in which the corresponding positions accurately coincide with each other. Also, since the energy separating plate, or the like, is located between the two detectors, the image signals recorded on the two detectors can be obtained with the radiation different in energy level. However, with the one-shot energy subtraction processing, the difference in energy level between the two detectors cannot be kept large, and the range of the subtraction image signal obtained from the subtraction process cannot be kept wide. Therefore, the contrast of the subtraction image reproduced from the subtraction image signal cannot be kept high.

As described above, the conventional one-shot energy subtraction processing and the conventional two-shot energy subtraction processing have their own drawbacks.

SUMMARY OF THE INVENTION

The primary object of the present invention is to provide a method of acquiring image information for energy subtraction processing, wherein two image signals to be subjected to a subtraction process are obtained such that they may represent images, which have recorded with two kinds of radiation having a large difference in energy level and in which the corresponding positions coincide with each other with a practically sufficient accuracy.

Another object of the present invention is to provide an apparatus for carrying out the method of acquiring image information for energy subtraction processing.

In a method and apparatus for acquiring image information for energy subtraction processing in accordance with the present invention, a stimulable phosphor sheet, which allows light detection from its opposite surfaces, is firstly exposed to radiation having a high energy level, which radiation carries image information of an object, and high energy image information of the object is thereby stored on the stimulable phosphor sheet. Immediately after the exposure, primarily only the high energy image information, which has been stored at a portion of the stimulable phosphor sheet on the object side (i.e., on the front surface side), is erased such that the high energy image information, which has been stored at a portion of the stimulable phosphor sheet on the side opposite to the object (i.e., on the back surface side), may not be erased. Also, immediately after the erasing, the stimulable phosphor sheet is exposed to radiation having a low energy level, which radiation carries image information of the object, and low energy image information of the object is thereby stored at the portion of the stimulable phosphor sheet on the front surface side. In this manner, the time interval between the two shots is set to be as short as possible, and deviation in position between the high energy image information and the low energy image information is thereby restricted. Also, the high energy image information and the low energy image information are recorded by quickly changing the radiation having a high energy level and the radiation having a low energy level over to each other. The two pieces of image information for energy subtraction processing are thereby obtained with the two kinds of radiation having a sufficiently large difference in energy level.

Specifically, the present invention provides a method of acquiring image information for energy subtraction processing, wherein high energy image information of an object corresponding to radiation having a high energy level, in which high energy components have been emphasized relatively to other energy components, and low energy image information of the object corresponding to radiation having a low energy level, in which low energy components have been emphasized relatively to other energy components, are acquired, the method comprising the steps of:

i) irradiating the radiation having a high energy level to the object, the high energy image information corresponding to the radiation having a high energy level, which radiation carries image information of the object, being thereby stored on a stimulable phosphor sheet, which allows light detection from its front surface that stands facing the object, and from its back surface that is opposite to the front surface, ii) erasing primarily the image information, which has been stored at a portion of the stimulable phosphor sheet on the front surface side, iii) thereafter irradiating the radiation having a low energy level to the object, the low energy image information corresponding to the radiation having a low energy level, which radiation carries image information of the object, being thereby stored on the stimulable phosphor sheet (primarily at the portion of the stimulable phosphor sheet on the front surface side), and iv) acquiring the low energy image information and the high energy image information, the low energy image information being acquired from the portion of the stimulable phosphor sheet on the front surface side, the high energy image information being acquired from the portion of the stimulable phosphor sheet on the back surface side.

The stimulable phosphor sheet, which allows light detection from its opposite surfaces, may be one of various stimulable phosphor sheets, which are designed such that the stored image information can be read out from the front surface and the back surface, respectively. For example, the stimulable phosphor sheet may comprise a transparent substrate and a single stimulable phosphor layer overlaid upon the substrate. Alternatively, the stimulable phosphor sheet may comprise a predetermined substrate and stimulable phosphor layers overlaid upon opposite surfaces of the substrate.

In cases where the stimulable phosphor sheet, which comprises a predetermined substrate and the stimulable phosphor layers overlaid upon the opposite surfaces of the substrate, is employed, the substrate should preferably be made from a material capable of absorbing the low energy components of the radiation. The material, which is capable of absorbing the low energy components of the radiation, need not necessarily absorb the low energy components of the radiation perfectly, and may be a material, which absorbs the low energy components of the radiation to a higher extent than the high energy components of the radiation. Also, an intermediate layer, which has the characteristics such that it may transmit stimulating rays and may not transmit erasing light, should preferably be located between the two stimulable phosphor layers. The intermediate layer may be located together with the substrate. Alternatively, the substrate may also serve as the intermediate layer. The intermediate layer should preferably have the characteristics such that it may not transmit the light, which is emitted by the stimulable phosphor layers when they are exposed to the stimulating rays. In such cases, the light, which is emitted by one of the stimulable phosphor layers and serves as the signal light, and the light, which is emitted by the other stimulable phosphor layer and serves as the signal light, can be prevented from being mixed into each other.

The term "acquiring image information" as used herein means detecting the image information as an electric signal, or the like, by exposing the stimulable phosphor sheet to the stimulating rays, such as a laser beam, which cause the stimulable phosphor sheet to emit light in proportion to the amount of energy stored thereon during its exposure to the radiation, and photoelectrically detecting the light emitted from each point that is being exposed to the stimulating rays.

The erasing of the image information, which has been stored at the portion of the stimulable phosphor sheet on the front surface side, may be carried out by radiating erasing light out of a flat plate-like erasing light source, which has an approximately uniform structure over its entire surface and is located such that it may stand facing the front surface of the stimulable phosphor sheet. In such cases, an electroluminescent (EL) panel, means comprising a source for producing the erasing light and a flat plate light guide for guiding the erasing light, or the like, may be employed as the erasing light source. In particular, the erasing light source should preferably have a low radiation absorptivity, and its thickness with respect to the direction, along which the radiation is irradiated, should preferably be thin.

Also, predetermined radiation may be employed as the radiation having a low energy level, and radiation, which is obtained by passing the predetermined radiation through a low energy component absorbing member having characteristics such that an absorptivity with respect to the low energy components may be higher than an absorptivity with respect to the high energy components, may be employed as the radiation having a high energy level. Alternatively, the radiation having a high energy level or the radiation having a low energy level may be radiated selectively out of a single radiation source, which is capable of radiating the radiation having a high energy level and the radiation having a low energy level such that they may be changed over to each other. In cases where the radiation having a high energy level is to be obtained by passing the predetermined radiation through the low energy component absorbing member, the low energy component absorbing member may be located in the vicinity of the radiation source and may be quickly moved into and out of the position between the radiation source and the object. In this manner, the radiation having a high energy level and the radiation having a low energy level can be quickly changed over to each other.

Further, the irradiation of the radiation having a low energy level should preferably be carried out within 100 milliseconds after the irradiation of the radiation having a high energy level. The irradiation of the radiation having a low energy level should more preferably be carried out within 50 milliseconds after the irradiation of the radiation having a high energy level.

The term "erasing primarily image information having been stored at a portion of a stimulable phosphor sheet on a front surface side" means that the image information, which has been stored at the portion of the stimulable phosphor sheet on the back surface side, is not erased substantially.

The foregoing also apply to an apparatus in accordance with the present invention, which will be described below.

The present invention also provides an apparatus for acquiring image information for energy subtraction processing, wherein high energy image information of an object corresponding to radiation having a high energy level, in which high energy components have been emphasized relatively to other energy components, and low energy image information of the object corresponding to radiation having a low energy level, in which low energy components have been emphasized relatively to other energy components, are acquired, the apparatus comprising:

i) a radiation source, which is capable of radiating the radiation having a high energy level and the radiation having a low energy level such that they may be changed over to each other, ii) a stimulable phosphor sheet, which allows light detection from its front surface that stands facing the object, and from its back surface that is opposite to the front surface, the stimulable phosphor sheet being located at a position that receives the radiation, which has been irradiated to the object and carries image information of the object, iii) a flat plate-like erasing light source, which has an approximately uniform structure over its entire surface and is located such that it may stand facing the front surface of the stimulable phosphor sheet, the erasing light source radiating erasing light for erasing primarily the image information, which has been stored at a portion of the stimulable phosphor sheet on the front surface side, and iv) a control means, which controls operations for:
 a) radiating the radiation having a high energy level out of the radiation source, the high energy image information being thereby stored on the stimulable phosphor sheet,
 b) radiating the erasing light out of the erasing light source, primarily the image information, which has been stored at the portion of the stimulable phosphor sheet on the front surface side, being thereby erased,
 c) thereafter radiating the radiation having a low energy level out of the radiation source, the low energy image information being thereby stored on the stimulable phosphor sheet (primarily at the portion of the stimulable phosphor sheet on the front surface side), and
 d) acquiring the low energy image information and the high energy image information, the low energy image information being acquired from the portion of the stimulable phosphor sheet on the front surface side, the high energy image information being acquired from the portion of the stimulable phosphor sheet on the back surface side.

In the apparatus for acquiring image information for energy subtraction processing in accordance with the present invention, the radiation source may be provided with:

a radiation tube for radiating a single kind of radiation, a low energy component absorbing member, which has characteristics such that an absorptivity with respect to the low energy components of the radiation may be higher than an absorptivity with respect to the high energy components of the radiation, the low energy component absorbing member being located such that it can be moved into a position between the radiation tube and the object and can be retracted from the position, and a drive means for moving the low energy component absorbing member into the position between the radiation tube and the object and retracting the low energy component absorbing member from the position in accordance with a predetermined instruction signal.

Alternatively, the radiation source may be constituted of a single radiation tube, which is capable of radiating the radiation having a high energy level and the radiation having a low energy level such that they may be changed over to each other in accordance with a predetermined instruction signal.

Also, the length of time occurring between the irradiation of the radiation having a high energy level and the irradiation of the radiation having a low energy level should preferably be set to be at most 100 milliseconds by the control means. The length of time occurring between the irradiation of the radiation having a high energy level and the irradiation of the radiation having a low energy level should more preferably be set to be at most 50 milliseconds.

With the method and apparatus for acquiring image information for energy subtraction processing in accordance with the present invention, the stimulable phosphor sheet, which allows light detection from its opposite surfaces, is firstly exposed to the radiation having a high energy level, which radiation carries image information of the object, and the high energy image information of the object is thereby stored on the stimulable phosphor sheet. Immediately after the exposure, primarily only the high energy image information, which has been stored at the portion of the stimulable phosphor sheet on the front surface side, is erased such that the high energy image information, which has been stored at the portion of the stimulable phosphor sheet on the back surface side, may not be erased. Also, immediately after the erasing, the stimulable phosphor sheet is exposed to the radiation having a low energy level, which radiation carries image information of the object, and the low energy image information of the object is thereby stored on the stimulable phosphor sheet (primarily at the portion of the stimulable phosphor sheet on the front surface side). In this manner, the time interval between the two shots can be set to be as short as possible, and deviation in position between the high energy image information and the low energy image information can thereby be restricted. Also, the high energy image information and the low energy image information are recorded by quickly changing the radiation having a high energy level and the radiation having a low energy level over to each other. The two pieces of image information for energy subtraction processing can thereby be obtained with the two kinds of radiation having a sufficiently large difference in energy level.

Therefore, the occurrence of noise due to deviation in position between the two images subjected to the energy subtraction processing can be restricted. Also, the two images subjected to the energy subtraction processing can be formed with the two kinds of radiation having a large difference in energy level. Accordingly, an energy subtraction image, which has a high contrast and good image quality, can be obtained from the energy subtraction processing.

DESCRIPTION OF THE PREFERRED EMBODIMENTS

Figure 1:
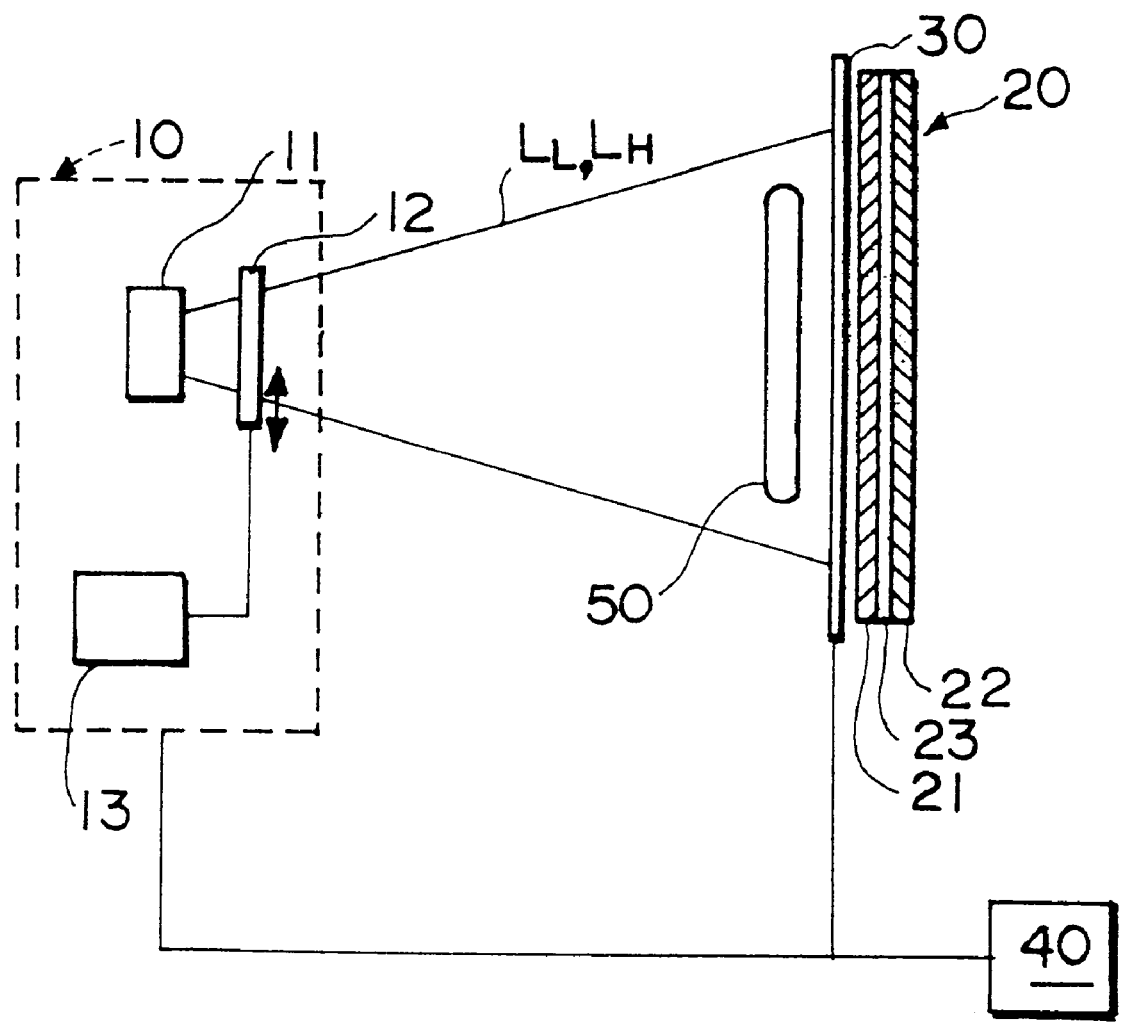
FIG. 1 is a schematic view showing an embodiment of the apparatus for acquiring image information for energy subtraction processing in accordance with the present invention.

The present invention will hereinbelow be described in further detail with reference to the accompanying drawing.

FIG. 1 is a schematic view showing a radiation image recording apparatus, which is an embodiment of the apparatus for acquiring image information for energy subtraction processing in accordance with the present invention.

With reference to FIG. 1, in the apparatus for acquiring image information for energy subtraction processing, high energy image information $S_H$ of an object 50 corresponding to radiation $L_H$ having a high energy level, in which high energy components have been emphasized relatively to other energy components, and low energy image information $S_L$ of the object 50 corresponding to radiation $L_L$ having a low energy level, in which low energy components have been emphasized relatively to other energy components, are acquired. The apparatus for acquiring image information for energy subtraction processing comprises a radiation source 10, which is capable of radiating the radiation $L_H$ having a high energy level and the radiation $L_L$ having a low energy level such that they may be changed over to each other. The apparatus also comprises a stimulable phosphor sheet 20, which allows light detection from its opposite surfaces and is located at a position that receives the radiation L', which has been irradiated to the object 50 and has passed through the object 50. The stimulable phosphor sheet 20 comprises a substrate 23, which is made from a material capable of absorbing the low energy components of the irradiated radiation L, and stimulable phosphor layers 21, 22, which are overlaid upon opposite surfaces of the substrate 23. The apparatus further comprises an EL panel 30, which has an approximately uniform structure over its entire surface and is located such that it may stand facing the stimulable phosphor layer 21 of the stimulable phosphor sheet 20, the stimulable phosphor layer 21 being located on the side of the object 50. The EL panel 30 radiates erasing light K for erasing primarily the image information, which has been stored on the stimulable phosphor layer 21 located on the side of the object 50. The apparatus still further comprises a control means 40. The control means 40 controls operations for: (a) radiating the radiation $L_H$ having a high energy level out of the radiation source 10, the high energy image information $S_H$ being thereby stored on the stimulable phosphor layers 21, 22 of the stimulable phosphor sheet 20, (b) radiating the erasing light K out of the EL panel 30, primarily the image information (the high energy image information $S_H$), which has been stored on the stimulable phosphor layer 21 located on the side of the object 50, being thereby erased, (c) thereafter radiating the radiation $L_L$ having a low energy level out of the radiation source 10, the low energy image information $S_L$ being thereby stored on the stimulable phosphor layer 21 of the stimulable phosphor sheet 20 located on the side of the object 50, and (d) acquiring the low energy image information $S_L$ and the high energy image information $S_H$, the low energy image information $S_L$ being acquired from the stimulable phosphor layer 21 of the stimulable phosphor sheet 20 located on the side of the object 50, the high energy image information $S_H$ being acquired from the stimulable phosphor layer 22 of the stimulable phosphor sheet 20, which layer is located on the side opposite to the object 50.

Specifically, the radiation source 10 is provided with a radiation tube 11 for radiating a single kind of radiation $L_O$, a low energy component absorbing member 12, and a drive means 13. The low energy component absorbing member 12 has the characteristics such that the absorptivity with respect to the low energy components of the radiation $L_O$ may be higher than the absorptivity with respect to the high energy components of the radiation $L_O$. The low energy component absorbing member 12 is located such that it can be moved into the position between the radiation tube 11 and the object 50 and can be retracted from the position. The drive means 13 moves the low energy component absorbing member 12 into the position between the radiation tube 11 and the object 50 and retracting the low energy component absorbing member 12 from the position in accordance with a predetermined instruction signal.

In this embodiment, the tube voltage of the radiation tube 11 is 100 kV. Also, a Cu (copper) filter having a thickness of 1 mm is employed as the low energy component absorbing member 12. The Cu filter 12 has a size such that the radiation (the radiation $L_H$ having a high energy level), which has passed through the Cu filter 12, may impinge upon the entire area of the stimulable phosphor sheet 20. Since the Cu filter 12 is located in the vicinity of the radiation tube 11, the size of the Cu filter 12 may be markedly smaller than the size of the stimulable phosphor sheet 20. Therefore, the distance, over which the Cu filter 12 must be moved when it is to be retracted from the position between the radiation tube 11 and the object 50, is short, and the movement of the Cu filter 12 can be finished within approximately 10 milliseconds.

The length of time, during which the EL panel 30 radiates the erasing light K for erasing the image information having been stored on the stimulable phosphor layer 21 located on the side of the object 50, is 50 milliseconds.

The length of time occurring between the irradiation of the radiation $L_H$ having a high energy level and the irradiation of the radiation $L_L$ having a low energy level is set to be at most 100 milliseconds by the control means 40.

How this embodiment of the apparatus for acquiring image information for energy subtraction processing operates will be described hereinbelow.

Firstly, the radiation $L_O$ is produced by the radiation tube 11 at a tube voltage of 100 kV and is irradiated for a short time via the Cu filter 12 toward the object 50, which lies on the stimulable phosphor sheet 20 via the EL panel 30. When the radiation $L_O$ passes through the Cu filter 12, the low energy components of the radiation are attenuated. As a result, the radiation $L_H$ having a high energy level, in which the high energy components have been emphasized relatively, is radiated out of the Cu filter 12. The radiation $L_H$ having a high energy level is irradiated to the object 50. The radiation $L_H$ having a high energy level, which has passed through the object 50, passes through the EL panel 30 and impinges upon the stimulable phosphor sheet 20.

The radiation $L_H$ having a high energy level, which impinges upon the stimulable phosphor sheet 20, firstly impinges upon the stimulable phosphor layer 21, which is located on the side close to the object 50. In this manner, the high energy image information $S_H$ of the object 50 is stored on the stimulable phosphor layer 21 with the radiation, in which the high energy components have been emphasized relatively. The radiation $L_H$ having a high energy level then passes through the substrate 23. When the radiation $L_H$ having a high energy level passes through the substrate 23, the low energy components are attenuated even further. As a result, radiation $L_H'$ having a high energy level, in which the high energy components have been emphasized even further, is radiated out of the substrate 23. The radiation $L_H'$ having a high energy level impinges upon the stimulable phosphor layer 22, which is located on the side remote from the object 50. In this manner, high energy image information $S_H'$ of the object 50 is stored on the stimulable phosphor layer 22 with the radiation, in which the high energy components have been emphasized even further.

Immediately after the aforesaid exposure has been carried out, specifically within approximately 10 milliseconds after the aforesaid exposure has been carried out, the drive means 13 retracts the Cu filter 12 from the position between the radiation tube 11 and the object 50 in accordance with the control operation of the control means 40.

Also, within 50 milliseconds after the aforesaid exposure, the EL panel 30 emits the erasing light K in accordance with the control operation of the control means 40. With the erasing light K, the high energy image information $S_H$, which has been stored on the stimulable phosphor layer 21 located on the side close to the object 50, is erased. It is sufficient for the erasing to be carried out such that the high energy image information $S_H$, which has been stored on the stimulable phosphor layer 21, may be erased to a certain extent. Strong erasing for rendering the stimulable phosphor sheet reusable need not be carried out.

Immediately after the erasing has been carried out, specifically within 100 milliseconds after the aforesaid exposure has been carried out, the radiation $L_O$ is produced by the radiation tube 11 at a tube voltage of 100 kV and is irradiated for a short time, without being passed through the Cu filter 12, toward the object 50, which lies on the stimulable phosphor sheet 20 via the EL panel 30. Since the radiation $L_O$ does not pass through the Cu filter 12, the low energy components of the radiation are not attenuated as in the aforesaid first exposure. Therefore, the radiation $L_O$ serves as the radiation $L_L$ (=$L_O$) having a low energy level, in which the low energy components have been emphasized relatively. The radiation $L_L$ having a low energy level is irradiated to the object 50. The radiation $L_L$ having a low energy level, which has passed through the object 50, passes through the EL panel 30 and impinges upon the stimulable phosphor sheet 20.

The radiation $L_L$ having a low energy level, which impinges upon the stimulable phosphor sheet 20, firstly impinges upon the stimulable phosphor layer 21, which is located on the side close to the object 50. In this manner, the low energy image information $S_L$ of the object 50 is stored on the stimulable phosphor layer 21 with the radiation, in which the low energy components have been emphasized relatively. Radiation $L_L'$, which has passed through the stimulable phosphor layer 21, then passes through the substrate 23. When the radiation $L_L'$ passes through the substrate 23, the low energy components are attenuated. As a result, radiation $L_H''$ having a high energy level, in which the high energy components have been emphasized relatively, is radiated out of the substrate 23. The radiation $L_H''$ having a high energy level impinges upon the stimulable phosphor layer 22, which is located on the side remote from the object 50. As a result, high energy image information $S_H''$ of the object 50 is stored on the stimulable phosphor layer 22 with the radiation, in which the high energy components have been emphasized relatively.

As for the stimulable phosphor layer 21 located on the side close to the object 50, the high energy image information $S_H$, which was stored with the first exposure, has been erased, and the low energy image information $S_L$ has been stored with the second exposure. Therefore, ultimately, the low energy image information $S_L$ is stored on the stimulable phosphor layer 21.

As for the stimulable phosphor layer 22 located on the side remote from the object 50, besides the high energy image information $S_H'$ having been stored with the first exposure, the high energy image information $S_H''$ is stored with the second exposure. Therefore, ultimately, the high energy image information $S_H'$ and the high energy image information $S_H''$ are stored on the stimulable phosphor layer 22.

The stored image information is then read out from each of the stimulable phosphor layers 21 and 22 of the stimulable phosphor sheet 20. In this manner, the low energy image information $S_L$ and the high energy image information $S_H'$, $S_H''$, which are suitable for the energy subtraction processing and have been formed with the different kinds of radiation having a larger difference in energy level than in the conventional one-shot energy subtraction processing, can be acquired from the stimulable phosphor sheet 20.

Further, in this embodiment, the stimulable phosphor sheet is firstly exposed to the radiation having a high energy level, which radiation carries image information of the object, and the high energy image information of the object is thereby stored on the stimulable phosphor sheet. Immediately after the exposure, only the image information, which has been stored on the stimulable phosphor layer located on the side of the object, is erased such that the high energy image information, which has been stored on the stimulable phosphor layer located on the side opposite to the object, may not be erased. Also, immediately after the erasing, the stimulable phosphor sheet is exposed to the radiation having a low energy level, which radiation carries image information of the object, and the low energy image information of the object is thereby stored on the stimulable phosphor layer located on the side of the object. In this manner, image signals to be subjected to the energy subtraction processing can be obtained within a shorter time than in the conventional two-shot energy subtraction processing. Therefore, deviation in position between the image information represented by the image signals can be restricted sufficiently.

As described above, with this embodiment of the apparatus for acquiring image information for energy subtraction processing in accordance with the present invention, the pieces of image information for energy subtraction processing, in which the deviation in position has been restricted to a higher extent than in the conventional two-shot energy subtraction processing and which have been formed with the different kinds of radiation having a larger difference in energy level than in the conventional one-shot energy subtraction processing, can be acquired. Therefore, from the thus acquired pieces of image information, an energy subtraction image can be obtained, in which the occurrence of noise due to deviation in position has been restricted more sufficiently than with the conventional techniques and which has a high contrast. Thus the energy subtraction image having good image quality can be obtained from the energy subtraction processing.

In the aforesaid embodiment, the radiation $L_H$ having a high energy level and the radiation $L_L$ having a low energy level are radiated out of the radiation source provided with the radiation tube for radiating a single kind of radiation, the low energy component absorbing member, and the drive means. The low energy component absorbing member has the characteristics such that the absorptivity with respect to the low energy components of the radiation may be higher than the absorptivity with respect to the high energy components of the radiation. The low energy component absorbing member is located such that it can be moved into the position between the radiation tube and the object and can be retracted from the position. The drive means moves the low energy component absorbing member into the position between the radiation tube and the object and retracting the low energy component absorbing member from the position in accordance with the predetermined instruction signal. However, the apparatus for acquiring image information for energy subtraction processing in accordance with the present invention is not limited to the embodiment, in which the aforesaid radiation source is employed. For example, the radiation source may be constituted of a single radiation tube, which is capable of radiating the radiation having a high energy level and the radiation having a low energy level such that they may be changed over to each other in accordance with a predetermined instruction signal. As another alternative, a source for radiating only the radiation having a high energy level and a source for radiating only the radiation having a low energy level may be employed.

The low energy component absorbing member is not limited to the Cu filter, and one of other members may be employed. The means for erasing the image information, which has been stored on the stimulable phosphor layer located on the side of the object, is not limited to the EL panel and may be constituted of a source for producing the erasing light and a flat plate light guide for guiding the erasing light, or the like.

The stimulable phosphor sheet, which allows light detection from its opposite surfaces, may be one of various stimulable phosphor sheets, which are designed such that the stored image information can be read out from the front surface and the back surface, respectively. The stimulable phosphor sheet is not limited to the stimulable phosphor sheet 20, which comprise the substrate 23 and the stimulable phosphor layers 21, 22 overlaid upon opposite surfaces of the substrate 23. For example, the stimulable phosphor sheet may comprise a transparent substrate and a single stimulable phosphor layer overlaid upon the substrate.

What is claimed is:

1. A method of acquiring image information for energy subtraction processing, wherein high energy image information of an object corresponding to radiation having a high energy level, in which high energy components have been emphasized relatively to other energy components, and low energy image information of the object corresponding to radiation having a low energy level, in which low energy components have been emphasized relatively to other energy components, are acquired, the method comprising the steps of:

i) irradiating the radiation having a high energy level to the object, the high energy image information corresponding to the radiation having a high energy level, which radiation carries image information of the object, being thereby stored on a stimulable phosphor sheet, which allows light detection from its front surface that stands facing the object, and from its back surface that is opposite to the front surface, ii) erasing primarily the image information, which has been stored at a portion of said stimulable phosphor sheet on the front surface side, iii) thereafter irradiating the radiation having a low energy level to the object, the low energy image information corresponding to the radiation having a low energy level, which radiation carries image information of the object, being thereby stored on said stimulable phosphor sheet, and iv) acquiring the low energy image information and the high energy image information, the low energy image information being acquired from the portion of said stimulable phosphor sheet on the front surface side, the high energy image information being acquired from the portion of said stimulable phosphor sheet on the back surface side.

2. A method as defined in claim 1 wherein the erasing of the image information, which has been stored at the portion of said stimulable phosphor sheet on the front surface side, is carried out by radiating erasing light out of a flat plate-like erasing light source, which has an approximately uniform structure over its entire surface and is located such that it may stand facing the front surface of said stimulable phosphor sheet.

3. A method as defined in claim 1 wherein predetermined radiation is employed as said radiation having a low energy level, and radiation, which is obtained by passing said predetermined radiation through a low energy component absorbing member having characteristics such that an absorptivity with respect to the low energy components may be higher than an absorptivity with respect to the high energy components, is employed as said radiation having a high energy level.

4. A method as defined in claim 1 wherein said radiation having a high energy level or said radiation having a low energy level is radiated selectively out of a single radiation source, which is capable of radiating the radiation having a high energy level and the radiation having a low energy level such that they may be changed over to each other.

5. A method as defined in claim 1 wherein the irradiation of said radiation having a low energy level is carried out within 100 milliseconds after the irradiation of said radiation having a high energy level.

6. An apparatus for acquiring image information for energy subtraction processing, wherein high energy image information of an object corresponding to radiation having a high energy level, in which high energy components have been emphasized relatively to other energy components, and low energy image information of the object corresponding to radiation having a low energy level, in which low energy components have been emphasized relatively to other energy components, are acquired, the apparatus comprising:

i) a radiation source, which is capable of radiating the radiation having a high energy level and the radiation having a low energy level such that they may be changed over to each other, ii) a stimulable phosphor sheet, which allows light detection from its front surface that stands facing the object, and from its back surface that is opposite to the front surface, said stimulable phosphor sheet being located at a position that receives the radiation, which has been irradiated to the object and carries image information of the object, iii) a flat plate-like erasing light source, which has an approximately uniform structure over its entire surface and is located such that it may stand facing the front surface of said stimulable phosphor sheet, said erasing light source radiating erasing light for erasing primarily the image information, which has been stored at a portion of said stimulable phosphor sheet on the front surface side, and iv) a control means, which controls operations for:

a) radiating the radiation having a high energy level out of said radiation source, the high energy image information being thereby stored on said stimulable phosphor sheet, b) radiating the erasing light out of said erasing light source, primarily the image information, which has been stored at the portion of said stimulable phosphor sheet on the front surface side, being thereby erased, c) thereafter radiating the radiation having a low energy level out of said radiation source, the low energy image information being thereby stored on said stimulable phosphor sheet, and d) acquiring the low energy image information and the high energy image information, the low energy image information being acquired from the portion of said stimulable phosphor sheet on the front surface side, the high energy image information being acquired from the portion of said stimulable phosphor sheet on the back surface side.

7. An apparatus as defined in claim 6 wherein said radiation source is provided with:

a radiation tube for radiating a single kind of radiation, a low energy component absorbing member, which has characteristics such that an absorptivity with respect to the low energy components of said radiation may be higher than an absorptivity with respect to the high energy components of said radiation, said low energy component absorbing member being located such that it can be moved into a position between said radiation tube and the object and can be retracted from said position, and a drive means for moving said low energy component absorbing member into said position between said radiation tube and the object and retracting said low energy component absorbing member from said position in accordance with a predetermined instruction signal.

8. An apparatus as defined in claim 6 wherein said radiation source is constituted of a single radiation tube, which is capable of radiating the radiation having a high energy level and the radiation having a low energy level such that they may be changed over to each other in accordance with a predetermined instruction signal.

9. An apparatus as defined in claim 6 wherein the length of time occurring between the irradiation of said radiation having a high energy level and the irradiation of said radiation having a low energy level is set to be at most 100 milliseconds by said control means.

* * * * *